UNITED STATES PATENT OFFICE.

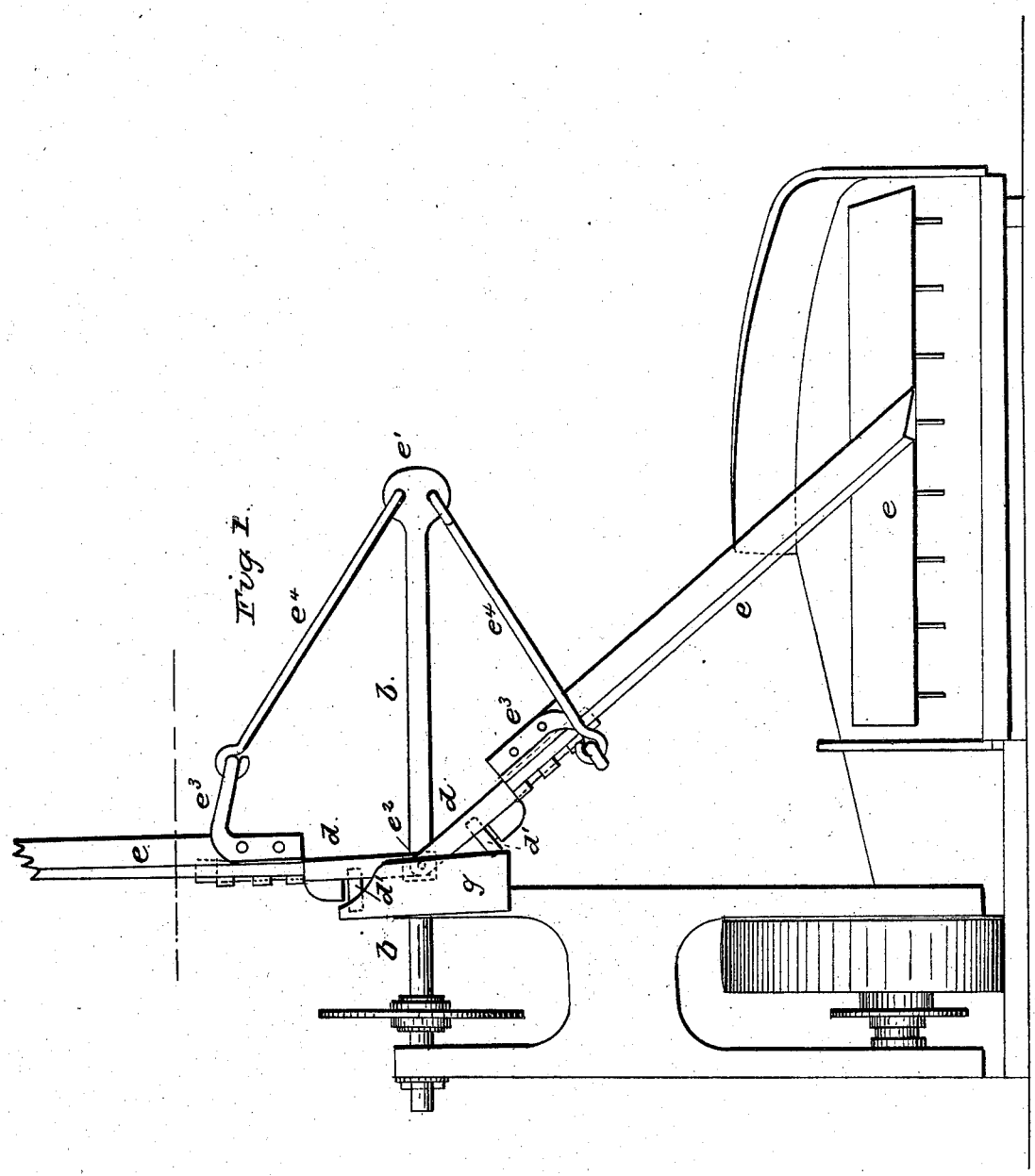

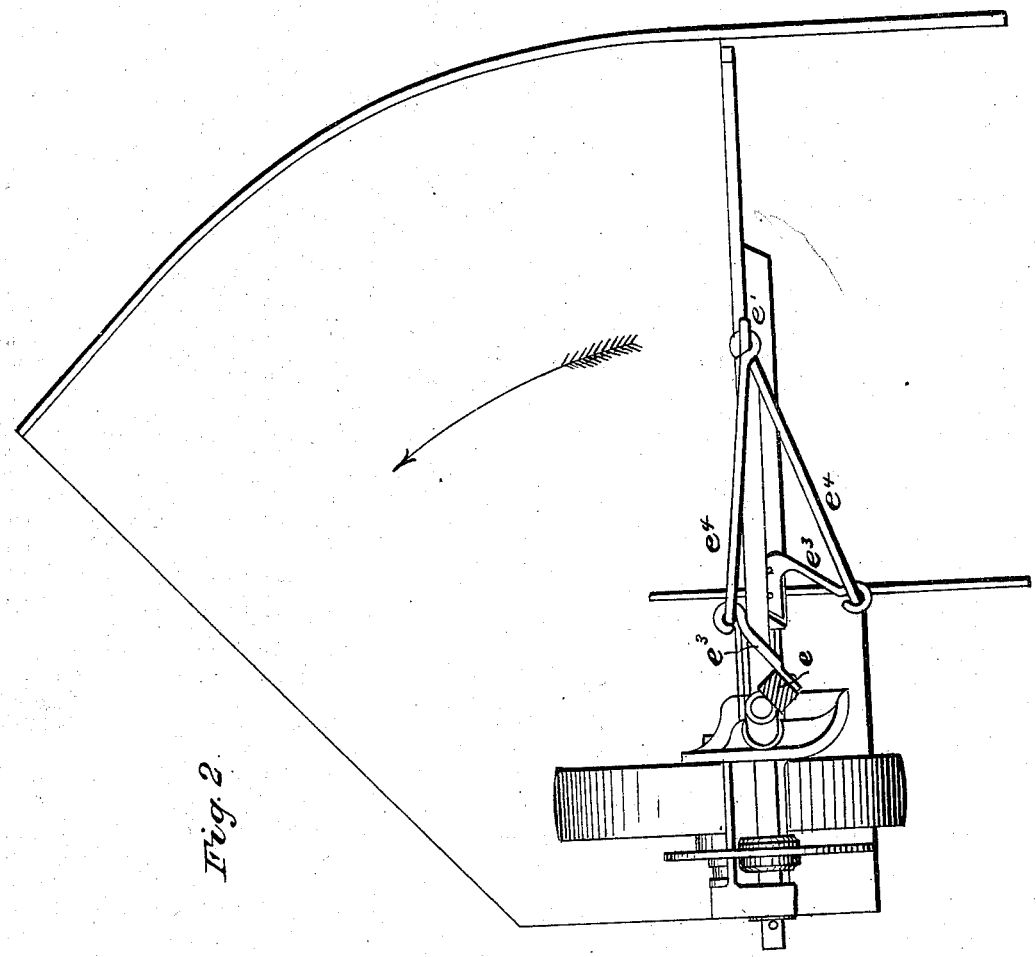

CHARLES THOMAS BURGESS, OF BRENTWOOD, ENGLAND.

IMPROVEMENT IN HARVESTER-RAKES.

Specification forming part of Letters Patent No. 83,599, dated November 3, 1868; patented in England, September 8, 1866.

*To all whom it may concern:*

Be it known that I, CHARLES THOMAS BURGESS, of Brentwood, in the county of Essex, England, a subject of the Queen of Great Britain, have invented or discovered new and useful Improvements in Reaping-Machines; and I, the said CHARLES THOMAS BURGESS, do hereby declare the nature of the said invention, and in what manner the same is to be performed, to be particularly described and ascertained in and by the following statement thereof—that is to say:

This invention has for its object improvements in reaping-machines; and consists in improved arrangements of mechanism for delivering the cut crop from off the platform onto which it falls when cut.

In reaping-machines as now constructed, it is commonly the case to employ what is termed a "reel" or "fly" to lay the crop as it is cut onto the platform, and for one, or it may be more, of the beaters of the fly to be a rake, which, after it has passed over the knife, is, by turning on an axis at one side of the platform, caused to sweep over the platform and push the cut crop lying upon it off one of its sides.

Now, according to my invention, I so actuate the delivery-rake (or it may be rakes) of the fly or reel of reaping-machines that the rake shall, as it moves back over the platform, be also moved endwise toward the draft side of the machine. This I effect by carrying the delivery rake or rakes by an arm or arms, which are inclined to the shaft of the reel, and which, as the rake or rakes move back over the platform, approach to a position at right angles with the axis. The rake or rakes will, by this means, not only be moved endwise toward the draft side of the machine as they are moving over the platform, but will also be kept down close to the platform, by reason of their being moved farther and farther from the axis as the arms which carry them approach more nearly to a position at right angles thereto. In addition to thus causing the rake or rakes to move toward the draft side of the machine, the rake or rakes may also at the same time be caused to move into a position inclined to the finger-beam.

The manner in which I prefer to carry out my invention is clearly shown in the drawings hereunto annexed.

Figure 1 shows a front view, and Fig. 2 is plan, of so much of a reaping-machine as is necessary for illustrating my improvements.

In these figures, *a* is the platform of the machine, fixed immediately behind the knife, as is usual. *b* is the axis of the reel, from which four beaters or rakes, *c*, are carried by suitable arms. One rake only is shown in the drawing. I, by preference, carry two opposite beaters on fixed arms, so that they will only act to lay the crop. The arms *d*, which carry the two other opposite beaters, I rigidly connect together, and, at the point where they embrace the axis, pins *e*, carried by the axis, are passed through them, so that the arms may turn on these pins. The arms *d* are not in a line with, but are at an angle to, one another, as shown—that is, their axial lines are in the same diametrical plane relatively to the reel-shaft, bent at an obtuse angle to each other.

Near one end of the axis, and concentric with it, is a fixed cam-surface, *g*, carried by the standard of the framing of the machine. Each of the opposite arms *d* at this end of the axis carries a roller, *d'*, which runs on the cam-surface, and the cam-surface is so formed that both rollers may always bear against it—that is, if the cam-surface has a projection on one side of the axis there is a corresponding depression on the opposite side. The cam-surface is also so formed that as each of the rakes *c* is, by the revolution of the axis, carried over the cutter, the arms that carry it shall be at their greatest inclination to the axis, and so that as the rake moves back over the platform the arms shall be caused to approach to a position at right angles to the axis. The rake *c* will by this means be moved endwise at the same time that it is carried round with the axis of the reel. The rake will thus be kept down close to the platform by reason of its being moved farther and farther from the axis as the arms that carry it approach more nearly to a position at right angles thereto. When thus arranged, the rake would, while revolving around and varying its distance from the reel-shaft, always remain parallel with the finger-beam, and would thus deliver the grain directly behind the knife.

If it be desired that the rake, after passing over the finger-beam, should, in place of continuing its movement parallel therewith, gradually turn into a position inclined thereto in order to discharge the gavel at one side of the machine, then each rake-arm, near to where it is attached to the axis of the reel, is made capable of turning on an axis, $e^2$, parallel, or nearly so, with its own length. To thus cause the rake-arm to turn upon its axis $e^2$, the rake-arm $e$ is formed with an arm, $e^3$, projecting out from it, and the outer end of this arm is connected by a link, $e^4$, to an eye, $e^1$, formed on the axis of the reel. By this means, as the rake moves back over the platform, and as the arm which carries it moves at that time toward a position at right angles to the axis of the reel, as hereinbefore explained, the point where the short arm $e^3$ is attached to the arm $e$ will be moved away from the fixed eye $e^1$, and consequently the rake-arm will at this time be caused to turn on the axis $e^2$, and the rake will be moved into a position parallel, or nearly so, with the back or delivery end of the platform. As the rake-arm again comes round to act as a beater to lay the crop, it is in like manner moved back to its original position, parallel with the axis of the reel.

In this case all of the beaters may, if desired, carry rake-teeth, and be caused to act not only to lay the crop, but also to deliver it off the platform onto which it falls when cut. All the arms which carry the beaters or rakes will then be operated in a similar manner. The cut crop will by this means be laid in a swath at the side of the machine; or if beaters without rake-teeth be substituted for three, or it might be two, of the rakes, then the machine will deliver the cut crop in bundles; or beaters without teeth may be substituted for all the rakes, and then used simply as a reel to lay the crop. Two opposite beaters of the reel might also, if preferred, be carried on fixed arms, so that they shall always act only to lay the crop, and not to deliver it, when cut, off the platform onto which it falls.

Having thus described the nature of my invention and the manner of performing the same, I would have it understood that what I claim is—

1. The combination, as herein described, of the reel-shaft, the rake-arms, and the cam for carrying the delivery rake or rakes of the reel or fly by the arm or arms, which are inclined to the shaft of the reel, and which are caused to vary their angle to the shaft, substantially as described.

2. The arrangement of mechanism herein described for causing the delivery rake of the reel or fly, as it is moved back over the platform, not only to move endwise toward the draft side of the machine, but also to turn into a position inclined to the line of the knife, substantially as hereinbefore described.

C. T. BURGESS.

Witnesses:
  THOS. BROWN,
  JOHN DEAN,
*Both of No. 17 Gracechurch Street, London, E. C.*